United States Patent
Nguyen et al.

(10) Patent No.: US 12,384,958 B2
(45) Date of Patent: Aug. 12, 2025

(54) COMPOSITIONS AND METHODS FOR IMPROVING THERMAL AND BRINE STABILITY OF NANOPARTICLES

(71) Applicant: ChampionX LLC, Sugar Land, TX (US)

(72) Inventors: Duy Nguyen, Richmond, TX (US); Chad Michael Gilmer, Sugar Land, TX (US); Gedeng Ruan, Houston, TX (US)

(73) Assignee: ChampionX LLC, Sugar Land, TX (US)

( * ) Notice: Subject to any disclaimer, the term of this patent is extended or adjusted under 35 U.S.C. 154(b) by 0 days.

(21) Appl. No.: 18/300,625

(22) Filed: Apr. 14, 2023

(65) Prior Publication Data

US 2023/0332041 A1    Oct. 19, 2023

Related U.S. Application Data

(60) Provisional application No. 63/363,046, filed on Apr. 15, 2022.

(51) Int. Cl.
 *C09K 8/92*   (2006.01)
 *C09K 8/035*  (2006.01)
 (Continued)

(52) U.S. Cl.
 CPC .............. *C09K 8/92* (2013.01); *C09K 8/035* (2013.01); *C09K 8/602* (2013.01); *C09K 8/665* (2013.01);
 (Continued)

(58) Field of Classification Search
 CPC .......... C09K 8/92; C09K 8/035; C09K 8/602; C09K 8/665; C09K 8/68; C09K 2208/10; E21B 21/00; E21B 43/16; E21B 43/26
 See application file for complete search history.

(56) References Cited

U.S. PATENT DOCUMENTS

| 9,873,827 B2 | 1/2018 | Chakraborty et al. |
| 10,377,942 B2 | 8/2019 | Southwell et al. |

(Continued)

FOREIGN PATENT DOCUMENTS

| KR | 101104390 B1 | 1/2012 |
| WO | 2009044912 A1 | 4/2009 |

OTHER PUBLICATIONS

Ahangaran et al., "Recent advances in chemical surface modification of metal oxide nanoparticles with silane coupling agents: A review," Advances in Colloid and Interface Science, 2020, vol. 286, No. 102298, pp. 1-20.
(Continued)

*Primary Examiner* — Silvana C Runyan
(74) *Attorney, Agent, or Firm* — McKee, Voorhees & Sease, PLC (57) ABSTRACT

Amine functionalized nanoparticles having improved thermal and brine stability comprising a core-shell nanoparticle morphology comprising a trialkoxyorganosilane coated nanoparticle core and an amine functionalized group on the surface of the nanoparticle as a shell are disclosed. Methods and applications of use of the amine functionalized nanoparticles and compositions comprising the amine functionalized nanoparticles dispersed in an aqueous medium are also disclosed.

19 Claims, 1 Drawing Sheet

(51) Int. Cl.
*C09K 8/60* (2006.01)
*C09K 8/66* (2006.01)
*C09K 8/68* (2006.01)
*E21B 21/00* (2006.01)
*E21B 43/16* (2006.01)
*E21B 43/26* (2006.01)

(52) U.S. Cl.
CPC ............ *C09K 8/68* (2013.01); *C09K 2208/10* (2013.01); *E21B 21/00* (2013.01); *E21B 43/16* (2013.01); *E21B 43/26* (2013.01)

(56) References Cited

U.S. PATENT DOCUMENTS

| | | | |
|---|---|---|---|
| 10,557,078 | B2 | 2/2020 | Southwell |
| 2003/0068486 | A1 | 4/2003 | Arney et al. |
| 2004/0102529 | A1 | 5/2004 | Campbell et al. |
| 2005/0228074 | A1* | 10/2005 | Warren .................. B82Y 30/00 428/407 |
| 2006/0155376 | A1 | 7/2006 | Asgari |
| 2009/0156757 | A1* | 6/2009 | Wang ..................... B82Y 30/00 977/789 |
| 2011/0171123 | A1 | 7/2011 | Shirtliff et al. |
| 2011/0256403 | A1* | 10/2011 | Wang ..................... B82Y 40/00 525/92 G |
| 2012/0201806 | A1* | 8/2012 | Silverstein ........... C08F 292/00 977/773 |
| 2012/0208029 | A1* | 8/2012 | Lin ...................... C09D 183/08 524/521 |
| 2012/0296124 | A1 | 11/2012 | Asefa et al. |
| 2013/0040069 | A1* | 2/2013 | Craton .................. C09J 133/10 427/516 |
| 2013/0324627 | A1* | 12/2013 | Silverstein ............... C08J 9/283 521/110 |
| 2014/0051186 | A1 | 2/2014 | Aizawa et al. |
| 2015/0218921 | A1 | 8/2015 | Suresh et al. |
| 2016/0068664 | A1 | 3/2016 | Suemura et al. |
| 2017/0009085 | A1* | 1/2017 | Bai ...................... C09D 5/1687 |
| 2019/0010382 | A1 | 1/2019 | Kuznetsov et al. |
| 2019/0062495 | A1 | 2/2019 | Meng et al. |
| 2019/0136123 | A1 | 5/2019 | Holcomb et al. |
| 2019/0299184 | A1 | 10/2019 | Suresh et al. |
| 2021/0040381 | A1 | 2/2021 | Holcomb et al. |
| 2021/0222059 | A1 | 7/2021 | Southwell et al. |
| 2023/0037819 | A1 | 2/2023 | Nguyen et al. |
| 2023/0080032 | A1 | 3/2023 | Xie et al. |
| 2023/0332041 | A1 | 10/2023 | Nguyen et al. |

OTHER PUBLICATIONS

Cao et al., "Application of Amino-Functionalized Nanosilica in Improving the Thermal Stability of Acrylamide-Based Polymer for Enhanced Oil Recovery," Energy & Fuels, 2018, vol. 32, pp. 246-254.

Cao et al., "Aqueous hybrids of amino-functionalized nanosilica and acrylamide-based polymer for enhanced oil recovery," RSC Advances, 2018, vol. 8, pp. 38056-38064.

Eshkalak et al., "Study of silanized-TiO2 nanoparticles modification by ionic liquid for white electronic ink application," Journal of Materials Science: Materials in Electronics, 2019, vol. 30, pp. 11307-11316.

Mousavi et al., "Silanization Mechanism of Silica Nanoparticles in Bitumen Using 3-Aminopropyl Triethoxysilane (APTES) and 3-Glycidyloxypropyl Trimethoxysilane (GPTMS)," ACS Sustainable Chemistry & Engineering, 2020, vol. 8, pp. 3231-3240.

Schmidt et al., "Aqueous Sol-Gel Derived Nanocomposite Coating Materials," MRS Online Proceedings Library (OPL), 1998, vol. 519, pp. 297-308.

International Search Report and Written Opinion in PCT/US23/65756, mailed Aug. 28, 2023, 15 pages.

* cited by examiner

COMPOSITIONS AND METHODS FOR IMPROVING THERMAL AND BRINE STABILITY OF NANOPARTICLES

CROSS REFERENCE TO RELATED APPLICATIONS

This application claims priority under 35 U.S.C. § 119 to provisional patent application U.S. Ser. No. 63/363,046, filed Apr. 15, 2022. The provisional patent application is herein incorporated by reference in its entirety, including without limitation, the specification, claims, and abstract, as well as any figures, tables, appendices, or drawings thereof.

TECHNICAL FIELD

The present disclosure relates generally to amine functionalized nanoparticles having improved thermal and brine stability. More specifically, methods of amine functionalization of colloidal nanoparticles, amine functionalized colloidal nanoparticle compositions, and methods of using the same for applications where improved thermal and brine stability are desired are disclosed.

BACKGROUND

The use of chemical additives for various enhanced oil recovery techniques are widely adapted to increase the rate or amount of hydrocarbon compounds recovered from hydrocarbon-bearing subterranean formations. Conventional uses of chemical additives include surfactants or polymers combined with a fluid, such as a water source, for underground injection. The surfactant chemical additives are used to lower the interfacial tension between the fluid and/or connate (subterranean water source) and the hydrocarbon (oil) and also increase wettability of the subterranean formation rock to increase yield of hydrocarbon compounds released and/or the rate of their recovery. Various chemical additives can also be used in "enhanced hydrocarbon recovery" to increase rate or total amount of hydrocarbon collected from established wells.

There is an ongoing need to enhance the properties of such chemical additives to overcome limitations on their performance. Namely, chemical additives can become unstable when combined with brine (saline water sources) or high total dissolved solids (TDS), causing precipitation and therefore decreasing its dispersion in an aqueous solution, thereby reducing its efficacy for oil recovery. There is also an ongoing need to enhance the thermal stability of such chemical additive to overcome additional limitations on their performance.

For example, various surfactant chemical additives become unstable or insoluble at high temperatures, such as in some subterranean formations where temperatures can exceed 60° C. or even reach temperatures as high as 250° C.

It is therefore an object of the disclosure to provide improved stability of functionalized nanoparticles in high temperature and high salinity conditions.

It is a further object of the disclosure to provide colloidal nanoparticles coated with amine functional groups to provide a positive (or partial positive) charge on the surface of the nanoparticle with a silane molecule.

It is another object of the disclosure to provide methods of using making the amine functionalized colloidal nanoparticles.

It is still another object of the disclosure to provide methods of using the amine functionalized colloidal nanoparticles in various applications of use in need of nanoparticles having improved thermal and/or brine stability, including improved hydrocarbon recovery in subterranean formations.

Other objects, embodiments and advantages of this disclosure will be apparent to one skilled in the art in view of the following disclosure, the drawings, and the appended claims.

BRIEF SUMMARY

According to an aspect of the present disclosure, amine functionalized nanoparticles comprise a core-shell nanoparticle morphology comprising a trialkoxyorganosilane coated nanoparticle core and an amine functionalized group on the surface of the nanoparticle as a shell, wherein the nanoparticle has an average particle size from about 1 nm to about 1000 nm.

According to an additional aspect of the present disclosure, amine functionalized nanoparticles comprise a reaction product obtained by a first step of coating a nanoparticle with a trialkoxyorganosilane and thereafter covalently bonding an amine-functionalized silane to the surface of the coated nanoparticle, wherein the reaction product has a core-shell nanoparticle morphology comprising the trialkoxyorganosilane coated nanoparticle core and the amine functionalized group on the surface of the coated nanoparticle core as a shell, and wherein the nanoparticle has an average particle size from about 1 nm to about 1000 nm.

According to an additional aspect of the present disclosure, an amine functionalized nanoparticle composition comprises the amine functionalized nanoparticles as described herein dispersed in an aqueous medium.

According to an additional aspect of the present disclosure, a composition for improving hydrocarbon recovery from a subterranean formation comprises an amine functionalized nanoparticle as described herein, a surfactant, a coupler and/or a solvent.

According to an additional aspect of the present disclosure, a injectate composition comprises a water source and the compositions described herein.

According to still further aspects of the disclosure, the compositions as described herein are used to increase the rate of hydrocarbon recovery, total yield of hydrocarbon recovered or both from a subterranean formation.

According to still further aspects of the disclosure, a method of treating a subterranean formation comprises introducing a treating fluid composition into a subterranean formation or well, wherein the treatment fluid composition comprises an amine functionalized nanoparticle as described herein, a solvent, and a surfactant composition, the surfactant composition comprising amphoteric surfactants, nonionic surfactants or a mixtures thereof.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described. While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

Various embodiments of the present disclosure will be described in detail with reference to the drawings, wherein like reference numerals represent like parts throughout the several views. Reference to various embodiments does not limit the scope of the invention. Figures represented herein are not limitations to the various embodiments and are presented for exemplary illustration of the various embodiments, which is defined by the scope of the appended claims. An artisan of ordinary skill in the art need not view, within isolated figure(s), the near infinite number of distinct permutations of features described in the following detailed description to facilitate an understanding of the present invention.

DETAILED DESCRIPTION

The present disclosure is not to be limited to that described herein, which can vary and are understood by skilled artisans. No features shown or described are essential to permit basic operation of the present disclosure unless otherwise indicated. It has been surprisingly found that a synergistic benefit to thermal and brines stability of amine functionalized nanoparticles is achieved when the nanoparticles are stabilized with the combination of a first step of coating with a trialkoxyorganosilane and thereafter functionalizing with an amine functionalized group on the surface of the nanoparticle.

It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects and embodiments are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions. This applies regardless of the breadth of the range.

As used herein, the term "and/or", e.g., "X and/or Y" shall be understood to mean either "X and Y" or "X or Y" and shall be taken to provide explicit support for both meanings or for either meaning, e.g. A and/or B includes the options i) A, ii) B or iii) A and B.

It is to be appreciated that certain features that are, for clarity, described herein in the context of separate embodiments, may also be provided in combination in a single embodiment. Conversely, various features that are, for brevity, described in the context of a single embodiment, may also be provided separately or in any sub-combination.

The methods and compositions of the present disclosure may comprise, consist essentially of, or consist of the components and ingredients of the present disclosure as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Unless defined otherwise, all technical and scientific terms used above have the same meaning as commonly understood by one of ordinary skill in the art to which embodiments of the present disclosure pertain.

The terms "invention" or "present invention" are not intended to refer to any single embodiment of the particular invention but encompass all possible embodiments as described in the specification and the claims.

The term "about," as used herein, refers to variation in the numerical quantity that can occur, for example, through typical measuring techniques and equipment, with respect to any quantifiable variable, including, but not limited to, mass, concentration, volume, time, temperature, yield, flow rate, pressure, pH, and the like. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups. In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "enhanced hydrocarbon recovery" or "enhanced oil recovery" refers to injection of compositions into a subterranean formation to increase the rate or total amount of hydrocarbon collected from a previously established well. Enhanced hydrocarbon recovery includes "secondary hydrocarbon (oil) recovery" which includes injection initiated when a reduction in the rate of flow of hydrocarbon from a well is observed. Enhanced hydrocarbon recovery also includes "tertiary hydrocarbon (oil) recovery," which includes injection initiated when rate of flow of hydrocarbon from a well has stopped or substantially stopped.

As used herein, the term "exemplary" refers to an example, an instance, or an illustration, and does not indicate a most preferred embodiment unless otherwise stated.

As used herein, the term "free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "generally" encompasses both "about" and "substantially."

As used herein, the term "high pressure" means pressure in excess of atmospheric pressure on the surface of the earth, or as encountered within one or more subterranean formations or subterranean formations as a result of natural forces present within the subterranean formation, as a result of human activity such as hydraulic fracturing, or a combination thereof.

As used herein, the term "high temperature" refers to a water source, a subterranean formation, or a combination thereof having a temperature of about 60° C. to 250° C., or about 60° C. to 120° C., as specified or determined by context.

As used herein, the term "high total dissolved solids" refers to a water source including at least about 0.5 wt % solids dissolved therein, and in some embodiments up to about 30 wt % solids dissolved therein. In general, "saline" or "salinity" refers to a water source wherein a portion or a substantial portion of the total dissolved solids are salts.

As used herein, the term "hydrocarbon" generally refers to crude petroleum products, such as crude oil or natural gas products such as methane, unless otherwise specified or determined by context. Crude petroleum products are hydrocarbon compounds as recovered or collected from a subterranean formation, and prior to any further processing or refining thereof.

As used herein, the term "injectate" means a composition for injecting into a subterranean formation, or a composition that is injected into a subterranean formation, or a composition previously injected into a subterranean formation and present therein. The injectate may further include a proppant, wherein the combination of injectate and proppant is referred to herein as a "fracturing fluid." Discussions related to injectates and injection of injectates generally also relates to fracturing fluids and injection of fracturing fluids, as specified or determined by context. It will be understood that the proppant present in a fracturing fluid does not materially affect the chemical properties of the injectate but instead is chemically inert or substantially chemically inert within the fracturing fluid. As such, discussions relating to improved rate or yield of hydrocarbon from a subterranean formation due to injection of an injectate, including modification of properties such as interfacial energy or rock surface wettability also apply generally to fracturing fluids, unless otherwise specified or determined by context.

As used herein, the term "nanoparticle" means particles having at least one dimension less than 1000 nm.

The term "produced water" refers to a water source that is present within and/or flows from a subterranean formation; produced water includes connate unless otherwise specified.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The term "substantially" refers to a great or significant extent. "Substantially" can thus refer to a plurality, majority, and/or a supermajority of said quantifiable variable, given proper context.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

As used herein, the term "surfactant" means a compound having at least one hydrophilic portion and at least one hydrophobic portion, wherein the compound is capable of spontaneous self-aggregation in aqueous compositions. Surfactants can also be referred to as "surface active agents" as they change the properties of a liquid at a surface when added to a liquid. Cationic surfactants have no anionic moieties covalently bonded to the molecule and one or more cationic moieties covalently bonded to the molecule. Anionic surfactants have no cationic moieties covalently bonded to the molecule and one or more anionic moieties covalently bonded to the molecule. Nonionic surfactants refer to those having no ionic moieties covalently bonded to the molecule. Amphoteric surfactants refer to those having one or more anionic moieties covalently bonded to the molecule and one or more cationic moieties covalently bonded to the molecule, and a net molecular charge of zero as they are electrically neutral compounds having formal unit electrical charges of opposite sign.

As used herein, the word "treatment" refers to any treatment for changing a condition of a wellbore or a subterranean formation. Examples of treatments include fluid-loss control, isolation, stimulation, or conformance control; however, the word "treatment" does not necessarily imply any particular treatment purpose.

As used herein, the term "water source" means a source of water comprising, consisting essentially of, or consisting of fresh water, tap water, well water, deionized water, distilled water, produced water, municipal water, waste water such as runoff water, "gray" water, or municipal waste water, treated or partially treated waste water, brackish water, or sea water, or a combination of two or more such water sources as determined by context. In some embodiments, a water source includes one or more salts, ions, buffers, acids, bases, surfactants, or other dissolved, dispersed, or emulsified compounds, materials, components, or combinations thereof. In some embodiments, a water source includes about 0 wt % to 35 wt % total dissolved solids. In some such embodiments, the total dissolved solids are substantially non-polymeric solids. In some such embodiments, the dissolved solids comprise, consist essentially of ionic compounds. Generally, the term "water source" includes all of the following unless otherwise specified or determined by context: water, connate, produced water, water having high total dissolved solids, water having high temperature, and water having both high total dissolved solids and high temperature. The terms "water based", "water solution", "aqueous" and the like generally refer to a composition including a water source The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

As used herein, the term "well" refers to a fluid connection between a hydrocarbon within a subterranean formation, and a point proximal to the surface of the earth suitably situated to collect at least a portion of the hydrocarbon. Optionally, the point of collection is further adapted to collect the hydrocarbon, or to inject an injectate into the subterranean formation, or both. Similarly, the term "wellbore" refers to a man-made fluid connection to a hydrocarbon within a subterranean formation. A wellbore is adapted to collect the hydrocarbon, or to inject an injectate into the subterranean formation, or both, for example by including one or more pipes, tanks, pumps and the like. A well may include one wellbore, or two or more wellbores.

Amine Functionalized Nanoparticles

The amine functionalized nanoparticles provide improved thermal and brine stability as a result of the covalent bonding of an amine-functionalized silane to the surface of the coated nanoparticle providing a cationic nanoparticle surface charge to provide the beneficial brine and thermal stability.

Nanoparticles are particles that have at least one dimension less than about 1000 nm. The nanoparticles selected for amine functionalization for improved thermal and brine stability have at least one dimension ranging from about 1-1000 nm. In some embodiments, the nanoparticles range from 1-500 nm; 1-400 nm; 1-250 nm; 1-100 nm; 1-50 nm; 200-500 nm; 200-400 nm; or 300-400 nm. In some embodiments a nanoparticle can have one of its dimensions larger than 1000 nm while another dimension is less than about 1000 nm and therefore it is considered a nanoparticle. In some embodiments, the size of a nanoparticle refers to the diameter or approximate diameter of a nanoparticle. For a population of nanoparticles, this can also be referred to as a Z-average particle size, which can be measured according to routine protocols known to one skilled in the art. In some embodiments, the size is measured by dynamic light scattering (DLS) (Z-average). In some embodiments, the size is measured by Transmission Electron Microscopy (TEM).

In some embodiments the nanoparticles selected for amine functionalization for improved thermal and brine stability have an average particle size that is from about 1-1000 nm. In some embodiments, the nanoparticles average particle size range from 1-500 nm; 1-400 nm; 1-250 nm; 1-100 nm; 1-50 nm; 200-500 nm; 200-400 nm; or 300-400 nm.

The nanoparticles can assume a variety of geometries, such as spheres, hollow shells, rods, plates, ribbons, prisms, stars, and combinations thereof. All geometries of nanoparticles can be employed as described herein.

Various nanoparticles can be modified to be amine functionalized for improved thermal and brine stability, including silica and metal-based nanoparticles. Silica nanoparticles include nanosilica, silicate nanoparticles, polyhedral oligomeric silsesquioxane (POSS) nanoparticles, colloidal silica, silicon dioxide nanoparticle dispersion (SDND), etc.

Metal based nanoparticles include, for example, aluminum, chromium, cobalt, copper, gold, iron, magnesium, nickel, platinum, silver, tin, titanium, zinc, and zirconium nanoparticles. In embodiments, the metal-based nanoparticles are transition metals. The nanoparticles described herein can also include mineral oxide nanoparticles. For example, the nanoparticles are aluminum oxide, antimony dioxide, copper oxide, iron oxide, magnesium oxide, nickel oxide, silicon dioxide, titanium oxide, zinc oxide, or zirconium dioxide nanoparticles.

In embodiments where non-silica nanoparticles are employed, they can be treated or prepared to have a surface layer of silica for further surface modification (hereinafter referred to as silica surface-modified nanoparticles).

In some embodiments, the nanoparticles are silica nanoparticles or alumina nanoparticles. In further embodiments, the nanoparticles are colloidal silica nanoparticles or colloidal alumina nanoparticles. In exemplary embodiments, the silica nanoparticles are silicon dioxide nanoparticles or colloidal silicon dioxide nanoparticles.

In embodiments, the nanoparticles for amine functionalization do not include ceramics, which are convention for use in improving tensile strength properties. Without being limited to a particular mechanism of action or intended use, the size of ceramics exceed that of desired nanoparticles and prevent further challenges in its ability to stabilize in aqueous system. In further embodiments, the nanoparticles for amine functionalization do not include carbon nanoparticles which require distinct surface modification from those described herein. The nanoparticles do not include carbon or carbon-based materials, such as carbon nanotubes (e.g., single-walled carbon nanotubes (SWCNTs), multi-walled carbon nanotubes (MWCNTs), and combinations thereof), carbon nanodiamonds, graphite, graphene, graphene oxide, fullerenes, and combinations thereof.

In embodiments the amine functionalized nanoparticle has a core-shell nanoparticle morphology. The nanoparticle has as amine functionalized group covalently bonded to a trialkoxyorganosilane coated nanoparticle. In particular the trialkoxyorganosilane is covalently bonded to the amine-functionalized silanes. The covalent bonding between the core-shell structure of the nanoparticle is distinct from various types of functionalized or modified nanoparticles that do not have covalently bonded functional groups and instead rely on sol-gel formulations which can easily be converted to different structures (i.e., gel by cooling and sol by heating). Often the sol-gel structures are used for combining with nanoparticles, e.g., in composites, as opposed to providing a stabilized nanoparticle for dispersion in an aqueous medium.

As referred to herein, the core-shell nanoparticle morphology refers to a trialkoxyorganosilane coated nanoparticle as the core and the shell comprising an amine functionalized group provided by an amine-containing silane on the surface of the nanoparticle. The core is the nanoparticle that is first functionalized with a covalently bonded trialkoxyorganosilane to provide a functional group on the surface of the coated nanoparticle for further functionalization. The second step adds the amine functionalized silane.

Figure 1:
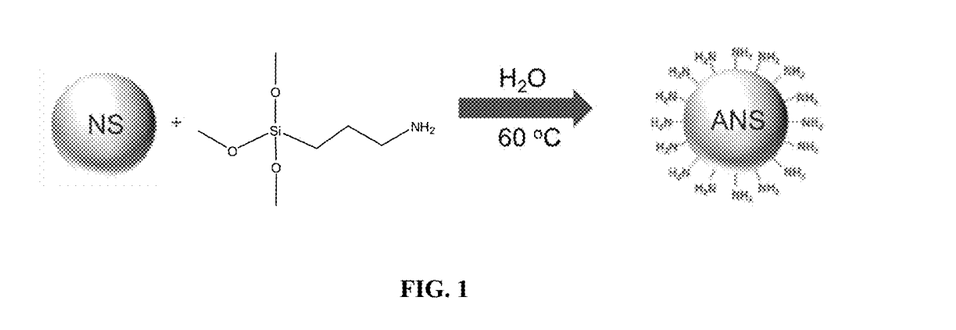
FIG. 1 shows steps for functionalization of silica nanoparticles as described in Example 1.

This core-shell nanoparticle morphology is generally depicted in FIG. 1 where the core is depicted as "NS" depicting a coated nanosilica embodiment of the nanoparticle that is functionalized with an amine-containing silane, which is depicted in the figure as (3-aminopropyl) trimethoxysilane (APTMS), wherein the amine groups are functionalized on the surface of the nanoparticles depicted as "ANS". FIG. 1 shows the chemical reaction between the functionalized colloidal nanosilica and APTMS to make the amine-functionalized colloidal silica, wherein the amine-containing silane remains intact and covalently bonded to the trialkyoxyorganosilane that coats the nanoparticle.

An exemplary trialkoxyorganosilane suitable for coating the nanoparticle for the core of the amine functionalized nanoparticle includes 3-glycidylkoxypropyl)trimethoxysilane (also referred to as glymo silane). Additional trialkoxyorganosilanes can include epoxy functional silanes, hydroxylic hydrophilic silane, hydroxyl functional silanes, and thiol functional silanes.

Exemplary epoxy functional silanes that can be used as the trialkoxyorganosilane suitable for coating the nanoparticle, include for example (3-glycidyloxypropyl)triethoxysilane (CAS 2602-34-8), 5,6-epoxyhexyltriethoxysilane (CAS 86138-01-4), 2-(3,4-epoxycyclohexyl)ethyltriethoxysilane (CAS 10217-34-2), and 2-(3,4-epoxycyclohexyl)ethyltrimethoxysilane (CAS 338-04-3).

Exemplary hydroxylic hydrophilic silanes that can be used as the trialkoxyorganosilane suitable for coating the nanoparticle, include for example hydroxymethyltriethoxysilane (CAS 162781-73-9), 3-[bis(2-hydroxyethyl)amino] propyl-triethoxysilane (CAS 7538-44-5), [hydroxy(polyethyleneoxy)propyl]triethoxysilane, and N-(3-triethoxysilylpropyl)gluconamide (CAS 104275-58-3).

Exemplary hydroxyl functional silanes that can be used as the trialkoxyorganosilane suitable for coating the nanoparticle, include for example hydroxymethyltriethoxysilane (CAS 162781-73-9), N(-hydroxyethyl)-N-methylaminopropyltrimethoxysilane (CAS 330457-46-0), and N-(3-triethoxysilylpropyl)gluconamide (CAS 104275-58-3). The hydroxyl functional silanes can include 1 or more hydroxyl groups.

Exemplary thiol functional silanes that can be used as the trialkoxyorganosilane suitable for coating the nanoparticle, include for example 3-mercaptopropyltrimethoxysilane (CAS 4420-74-0), 3-mercaptopropyltriethoxysilane (CAS 14814-09-6), 11-mercaptoundecyltrimethoxysilane (CAS 877593-17-4), (mercaptomethyl)methyldiethoxysilane (CAS 55161-63-2), 3-mercaptopropylmethyldimethoxysilane (CAS 31001-77-1), etc.

Suitable amine-functionalized silanes for providing the amine functionalized group on the surface of the nanoparticle include the formula I as shown (I)

wherein:
$R^1$, $R^2$, and $R^3$ are independently —OMCH$_3$, —OH, —CH$_3$, or —Cl and wherein M is absent, —(CH$_2$)$_m$—, or —(CH$_2$Y)$_n$—, wherein m is an integer from 1 to 5, n is an integer from 1 to 5, wherein Y is O, N, or S; and
$R^4$ is —CH$_2$, or a substituted or an unsubstituted, linear or branched C2-C20 alkyl group, or —(Ar)—.

Additional suitable amine-functionalized silanes for providing the amine functionalized group on the surface of the nanoparticle include the formula II as shown (II)

wherein:
$R^1$, $R^2$, and $R^3$ are independently —OMCH$_3$, —OH, —CH$_3$, or —Cl and wherein M is absent, —(CH$_2$)$_m$—, or —(CH$_2$Y)$_n$—, wherein m is an integer from 1 to 5, n is an integer from 1 to 5, wherein Y is O, N, or S; and
$R^4$ is —CH$_2$, or a substituted or an unsubstituted, linear or branched C2-C20 alkyl group, or —(Ar)—;
$R^5$ is absent or H; and
$R^6$ is —CH$_3$, a substituted or an unsubstituted, linear or branched C2-C20 alkyl group or a primary, secondary, tertiary or quaternary alkyl amine, —(Ar)—, =(CNH$_2$NH$_2$), —((CH$_2$)$_o$NH$_2$), —((CH$_2$)$_o$NHCH$_3$), —((CH$_2$)$_o$NH(CH$_2$)$_p$NH$_2$), —((CH$_2$)$_o$NH(CH$_2$)$_p$Ar), wherein o and p are independently integers from 1 to 15.

In a preferred embodiment the amine-functionalized silane is (3-aminopropyl)trimethoxysilane as shown in the following formula:

(CAS 919-30-2)

In embodiments the amine-functionalized silanes can have 0, 1, 2, or 3 alkyl oxy groups attached to the silica, such that $R^1$, $R^2$, and $R^3$ are independently —OCH$_3$, —OH, —CH$_3$, or —Cl Exemplary amine-functionalized silanes having 3, 2, 1, or 0 alkyl oxy groups attached to the silica are shown here respectively as (3-aminopropyl)trimethoxysilane (CAS 919-30-2), (3-Aminopropyl)methyldimethoxysilane (CAS 3663-44-3), (3-aminopropyl)dimethylmethoxysilane (CAS 31024-26-7), and 3-aminopropylsilanetriol (CAS 58160-99-9):

An additional amine-functionalized silanes having 3, 2, 1, or 0 alkyl oxy groups attached to the silica includes (3-aminopropyl)methyldiethoxysilane (CAS 3179-76-8).

In embodiments the amine-functionalized silanes can have 0, 1, 2, or 3 alkyl oxy groups attached to the silica, wherein the alkyl oxy groups have different number of carbons and heteroatoms, such that $R^1$, $R^2$, and $R^3$ are independently —OCH$_3$, —OH, —CH$_3$, or —Cl and wherein M is absent, —(CH$_2$)$_m$, or —(CH$_{2m}$Y)$_n$, wherein m is an integer from 1 to 5, n is an integer from 1 to 5, wherein Y is O, N, or S. Exemplary amine-functionalized silanes shown with 3 alkyl oxy groups attached to the silica and different number of carbons and heteroatoms are shown here respectively as (3-aminopropyl)trimethoxysilane (CAS 919-30-2), 3-triethoxysilylpropan-1-amine (CAS 919-30-2), and 3-[tris[2-(2-methoxyethoxy)ethoxy]silyl]propan-1-amine (CAS 87994-64-7).

In embodiments the amine-functionalized silanes can have varying chain lengths between the amine group and the silica atom, such that $R^4$ is —CH$_2$, or a substituted or an unsubstituted, linear or branched C2-C20, C2-C15, or C2-C11 alkyl group. Exemplary amine-functionalized silanes having varying chain lengths between the amine group and the silica atom are shown here respectively as (3-aminopropyl)trimethoxysilane (CAS 919-30-2), 4-triethoxysilylbutan-1-amine (CAS 3069-30-5), and 2,2-dimethyl-4-trimethoxysilylbutan-1-amine (CAS 157923-74-5).

In embodiments the amine-functionalized silanes can have varying chain lengths and spacers between the amine group and the silica atom, such that $R^5$ is absent or H; and $R^6$ is —CH$_3$, a substituted or an unsubstituted, linear or branched C2-C20, C2-C15, or C2-C10 alkyl group, a primary, secondary, tertiary or quaternary alkyl amine, —(Ar)—, —((CH$_2$)$_o$NH$_2$), —((CH$_2$)$_o$NHCH$_3$), —((CH$_2$)$_o$NH(CH$_2$)$_p$NH$_2$), —((CH$_2$)$_o$NH(CH$_2$)$_p$Ar), wherein o and p are independently integers from 1 to 15, 1 to 10, or 1 to 5. Exemplary amine-functionalized silanes having varying chain lengths and space groups between the amine group and the silica atom are shown here respectively as 3-(3-trimethoxysilylpropoxy)aniline (CAS 71550-66-8) and N'-benzyl-N-(3-trimethoxysilylpropyl)ethane-1,2-diamine (CAS 62604-61-9).

In embodiments the amine-functionalized silanes can have multiple amines on the silane molecule, such that $R^5$ is absent or H; and $R^6$ is —CH$_3$, a substituted or an unsubstituted, linear or branched C2-C20 alkyl group, a primary, secondary, tertiary or quaternary alkyl amine, —(Ar)—, =(CNH$_2$NH$_2$), —((CH$_2$)$_o$NH$_2$), —((CH$_2$)$_o$NHCH$_3$), —((CH$_2$)$_o$NH(CH$_2$)$_p$NH$_2$), —((CH$_2$)$_o$NH(CH$_2$)$_p$Ar), wherein o and p are independently integers from 1 to 15. Exemplary amine-functionalized silanes having multiple amines on the silane molecules are shown respectively as 2-(3-trimethoxysilylpropyl)guanidine (CAS 128310-21-4), N'-[2-(3-trimethoxysilylpropylamino)ethyl]ethane-1,2-diamine (CAS 35141-30-1), and N'-[3-[dimethoxy(methyl)silyl]propyl]ethane-1,2-diamine (CAS 3069-29-2):

In embodiments the amine-functionalized silanes can have primary, secondary, tertiary, or quaternary amines on the silane molecule, such that $R^5$ is absent or H; and $R^6$ is —$CH_3$, a substituted or an unsubstituted, linear or branched C2-C20 alkyl group or primary, secondary, tertiary or quaternary alkyl amine, —(Ar)—, =(CNH$_2$NH$_2$), —((CH$_2$)$_o$NH$_2$), —((CH$_2$)$_o$NHCH$_3$), —((CH$_2$)$_o$NH(CH$_2$)$_p$NH$_2$), —((CH$_2$)$_o$NH(CH$_2$)$_p$Ar), wherein o and p are independently integers from 1 to 15, 1 to 10, or 1 to 5. Exemplary primary, secondary, tertiary, or quaternary amines on the silane molecules are shown here respectively as (3-aminopropyl)trimethoxysilane (CAS 919-30-2), trimethyl(3-trimethoxysilylpropyl)azanium; chloride (CAS 35141-36-7), N-methyl-3-trimethoxysilylpropan-1-amine (CAS 3069-25-8), and N,N-diethyl-3-trimethoxysilylpropan-1-amine (CAS 41051-80-3).

In some embodiments, the amine functionalized group is provided by an amine-functionalized silane according to formula I or II, $$R^2—\underset{\underset{R^1}{|}}{\overset{\overset{R^3}{|}}{Si}}—R^4NH_2 \quad \text{or} \quad \text{(I)}$$

$$R^2—\underset{\underset{R^1}{|}}{\overset{\overset{R^3}{|}}{Si}}—R^4NR^5R^6 \quad \text{(II)}$$

wherein:
R$^1$, R$^2$, and R$^3$ are independently —OMCH$_3$, —OH, —CH$_3$, or —Cl and wherein M is absent, —(CH$_2$)$_m$—, or —(CH$_2$Y)$_n$—, wherein m is an integer from 1 to 5, or 1 to 2, n is an integer from 1 to 5, wherein Y is O, N, or S;
R$^4$ is —CH$_2$, or a substituted or an unsubstituted, linear or branched C2-C20, C2-C15, or C2-C11 alkyl group, or —(Ar)—;
R$^5$ is absent or H; and
R$^6$ is —CH$_3$, a substituted or an unsubstituted, linear or branched C2-C20 alkyl group or a primary, secondary, tertiary or quaternary alkyl amine, —(Ar)—, =(CNH$_2$NH$_2$), —((CH$_2$)$_o$NH$_2$), —((CH$_2$)$_o$NHCH$_3$), —((CH$_2$)$_o$NH(CH$_2$)$_p$NH$_2$), —((CH$_2$)$_o$NH(CH$_2$)$_p$Ar), wherein o and p are independently integers from 1 to 15, 1 to 10, or 1 to 5.

In some embodiments, the ratio (based on mass) of the trialkoxyorganosilane (e.g. (3-glycidylkoxypropyl)trimethoxysilane) to the amine-functionalized silane on the surface of the nanoparticles is at least about 1:1. In further embodiments the molar ratio of the trialkoxyorganosilane (e.g. (3-glycidylkoxypropyl)trimethoxysilane) to the amine-functionalized silane is from about 100:1 to about 1:100, preferably about 1:1 to about 100:1, about 1:1 to about 20:1, about 1:1 to about 10:1, or about 1:1 to about 5:1.

In some embodiments, the ratio (based on mass) of the nanoparticle coated with the trialkoxyorganosilane to the amine-functionalized silane on the surface of the coated nanoparticle is at least about 1:1. In further embodiments the mass ratio of the nanoparticle coated with the trialkoxyorganosilane to the amine-functionalized silane on the surface of the coated nanoparticle is from about 1:100 to about 100:1, preferably from about 1:1 to about 100:1, 1:1 to about 40:1, or 1:1 to about 15:1.

In an embodiment the nanoparticle coated with the trialkoxyorganosilane and thereafter functionalized with the amine-functionalized silane on the surface of the coated nanoparticle can have varying extent of coating. For example, in embodiments the nanoparticle is at least partially coated with the trialkoxyorganosilane, and preferably substantially or fully coated with the trialkoxyorganosilane. As one skilled in the art will ascertain, the extent of the coating of the nanoparticle with the trialkoxyorganosilane will then determine the extent of functionalization of the surface of the nanoparticle with the amine-functionalized silane as it covalently bonds to the trialkoxyorganosilane.

The nanoparticles described herein beneficially exhibit improved thermal and brine stability. As referred to herein, brine is understood to refer to the aqueous mixture of water and dissolved salts such as NaCl, CaCl$_2$, KCl, MgCl$_2$ and others, that are well known in subterranean formations in oilfield applications. The aqueous salt mixture that is commonly referred to as brine can be quantified based on the total dissolved solids (TDS) of the salts in the water. Brine conditions for different regions and wells vary significantly. In an embodiment, the nanoparticles are compatible in aqueous dispersions and use conditions having in excess of about 100,000 TDS, in excess of about 150,000 TDS, in excess of about 200,000 TDS, or in excess of about 250,000 TDS. In some embodiments, the nanoparticles are brine stable under Bakken conditions which is a 270,000 TDS at about 130° C. The brine stability can be measured by confirming a nanoparticle's ability to remain in dispersion (i.e., do not agglomerate or precipitate) at elevated levels of TDS over at least about 7 days, or even 10 days. The nanoparticle remaining in dispersion without precipitation is a visual assessment to confirm stability. Alternatively, the brine stability can be assessed by measuring a turbidity less than 1 NTU.

The thermal stability of the nanoparticles can be measured by confirming a nanoparticle's ability to remain in dispersion (i.e. do not agglomerate or precipitate) at elevated temperatures of at least about 60° C. to about 250° C., about 100° C. to 250° C., or about 100° C. to 200° C.; about 100° C. to 190° C., or about 100° C. to 180° C., or about 100° C. to 170° C., or about 100° C. to 160° C., or about 100° C. to 150° C., or about 130° C. for periods of at least 7 days to 30 days.

Further, in some embodiments the nanoparticles are stable for the foregoing periods of time and/or at the foregoing temperatures under high pressure (pressure in excess of atmospheric pressure on the surface of the earth) such as pressure encountered naturally in subterranean environments, pressure applied during hydraulic fracturing or another human-facilitated subterranean process, or a combination thereof.

Compositions

The amine functionalized nanoparticles as described herein can be provided in a composition comprising the amine functionalized nanoparticle dispersed in an aqueous medium. The compositions can be provided as concentrates, injectates, fracturing fluids, and/or the like.

In some embodiments, the amine functionalized nanoparticles make up between about 0.01-50 wt % based on the total weight of the composition. In other embodiments, the amine functionalized nanoparticles are between about 0.1-50 wt %, about 1-50 wt %, about 10-50 wt %, about 10-40 wt %, about 20-50 wt %, about 30-40 wt %, about 40-50 wt % and about 20-40 wt % based on the total weight of the composition.

The compositions can include a solvent (which may be referred to as a co-solvent or a mutual solvent) to provide an aqueous medium. Suitable solvents comprise, consist essentially of, or consist of linear, branched, or cyclic aliphatic alcohols having 1 to 6 carbon atoms, diols having 1 to 6 carbon atoms, alkyl ethers of alkylene glycols wherein the alkyl moiety has 1 to 6 carbon atoms (e.g., ethylene glycol mono-n-butyl ether), polyalkylene glycols, and mixtures thereof. Also useful as solvents are glycol and glycerol-based acetals and ketals, such as those formed from the condensation of e.g., glycerol with formaldehyde, acetone, or oxocarboxylic acids, semialdehydes, and esters thereof such as levulinic acid or an alkyl levulinate. In some embodiments, the solvent comprises, consists essentially of, or consists of methanol, ethanol, propanol, butanol, glycerol, ethylene glycol, ethylene glycol monoalkyl ether wherein the ether moiety comprises 1 to 6 carbon atoms, or a combination of two or more thereof. In some embodiments, the solvent is ethylene glycol and diethylene glycol.

The total amount of solvent included in the concentrate is about 0.01 wt % to 30 wt %, or about 0.1 wt % to 30 wt %, or about 1 wt % to 30 wt %, or about 5 wt % to 30 wt % based on the total weight of a concentrate, for example about 0.01 wt % to 25 wt %, or about 0.1 wt % to 20 wt %, or about 1 wt % to 20 wt %, or about 5 wt % to 25 wt %, or about 5 wt % to 20 wt %, or about 5 wt % to 15 wt %, or about 6 wt % to 30 wt %, or about 7 wt % to 30 wt %, or about 8 wt % to 30 wt %, or about 9 wt % to 30 wt %, or about 10 wt % to 30 wt % based on the total weight of a concentrate. The solvent is generally not included in the list of "actives" or active ingredients, but is present in the concentrate to promote and increase storage stability of the concentrate as well as facilitate stability of the composition during dilution of the concentrate to form an injectate. Additionally, in some embodiments the solvent further suppress the freezing point of the concentrate which is advantageous for winter storage and transportation purposes. Finally, in some embodiments the solvent reduce the viscosity of a concentrate, increasing the pumpability and pourability of the concentrate over a range of field use temperatures.

The compositions comprising an amine functionalized nanoparticle and an aqueous medium can further include additional components, such as surfactants. For example, surfactants can be used in combination with the nanoparticles to further aid in increased hydrocarbon yields, such as crude oil, from subterranean formations, increase the rate of hydrocarbon recovery or both, by lowering a subterranean interfacial tension.

In some embodiments the surfactants are selected from amphoteric or nonionic surfactants. In some embodiments the surfactants are a blend of two or more amphoteric surfactants and nonionic surfactants. The amphoteric surfactant, also termed a zwitterionic surfactant, includes at least one internal anionic moiety, at least one internal cationic moiety, and has a net internal charge of zero. In some embodiments, the amphoteric surfactant comprises, consists essentially of, or consists of a single internal cation, a single internal anion, and a hydrophobic moiety selected from linear, branched, alicyclic, aryl, and alkaryl groups having 6 to 50 carbon atoms. In some embodiments, the amphoteric surfactant includes at least one internal cationic moiety comprising ammonium or phosphonium; and at least one internal anionic moiety comprising sulfonate, sulfate, oxide, carboxylate, phosphate, phosphite, or phosphonate. In some embodiments, the amphoteric surfactant includes at least one internal cationic moiety comprising ammonium or phosphonium; and at least one internal anionic moiety comprising sulfonate. In some embodiments, the amphoteric surfactant includes at least one internal hydroxyl group.

Examples of useful amphoteric surfactants include those having a hydrophobic moiety selected from linear, branched, alicyclic, aiyl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms. One useful class of amphoteric surfactants is amino acids having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms, including for example N-dodecyl-N,N-dimethyl glycine. Another class of useful amphoteric surfactants is trialkylamine oxides having a hydrophobic moiety selected from linear, branched, alicyclic, aiyl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms. Representative examples of such amphoteric surfactants include N,N-dimethyl-N-dodecyl amine oxide, N,N-dimethyl-N-hexadecyl amine oxide, N,N-dimethyl-N-octadecyl amine oxide, and N,N-dimethyl-N—(Z-9-octadecenyl)-N-amine oxide.

Another class of useful amphoteric surfactants is betaines, which include one internal carboxylate moiety, one internal ammonium moiety, and a hydrophobic moiety selected from linear, branched, alicyclic, alkyl, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 10 to 16 carbon atoms, or 12 to 30 carbon atoms. Representative but nonlimiting examples of betaines include 2-(dodecyldimethylammonio) acetate (CAS No. 683-10-3), cocamidopropyl betaine (2-[3-(dodecanoylamino)propyl-dimethy lazaniumyl] acetate), dodecanamidopropyl betaine (12-[3-(dodecanoylamino)propyl]triazan-2-ium-2-yl)acetate), cetyl betaine (2-[hexadecyl(dimethyl)azaniumyl] acetate), oleamidopropyl betaine ((Z)-(carboxymethyl)dimethyl-3-((1-oxo-9-octadecenyl)amino)propylammonium hydroxide), caprylamidopropyl betaine (2-[dimethyl-[3-(octanoylamino)propyl]azaniumyl] acetate), and C10-16-alkyl (2-hydroxy-3-sulfopropyl)dimethyl (Mackam™ LHS supplied by Solvay.)

Another class of useful amphoteric surfactants is sultaines, which include one internal sulfonate moiety and one internal ammonium moiety (also referred to as sulfobetaines). Examples of sultaines are lauryl sulfobetaine (3-(dodecyldimethylammonio)propane-1-sulfonate), caprylyl sulfobetaine (3-[decyl(dimethyl)azaniumyl]propane-1-sulfonate), myristyl sulfobetaine (3-[dimethyl(tetradecyl)azaniumyl] propane-1-sulfonate), Sulfobetaine 10 (CAS No. 15163-36-7), Sulfobetaine 3-14 (N-tetradecyl-N,N-dimethyl-3-ammonio-1-propanesulfonate), Sulfobetaine 3-10 (N-decyl-N,N-dimethyl-3-ammonio-1-propanesulfonate); alkylether hydroxypropyl sultaines and alkyldimethylhydroxysultaines such as lauryl hydroxy sultaine (3-[dodecyl(dimethyl)ammonio]-2-hydroxypropane-1-sulfonate; 351.55 g/mol; CAS No. 13197-76-7), myristamidopropyl hydroxysultaine (2-hydroxy-N,N-dimethyl-N-(3-((1-oxotetradecyl)amino)propyl)-3-sulfo-, inner salt); cocoamidopropyl hydroxysultaine, and the like. Mixtures of such surfactants having various carbon chain lengths are obtained in some embodiments; for example, 3-((C10-C16)-alkyldimethylammonio)-2-hydroxypropanesulfonate (CAS No. 72869-77-3) is a mixture of alkylated moieties having an average of 10 to 16 carbons.

Another class of useful amphoteric surfactants is phosphate functional amphoteric surfactants, which include one internal phosphate moiety, one internal ammonium moiety, optionally a carboxylate moiety, and either one or two hydrophobic moieties, wherein each hydrophobic moiety is selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms. Representative but nonlimiting examples of phosphate functional amphoteric surfactants include phosphatidylserines, phosphatidylethanolamines, phosphatidylcholines such as 1-oleoyl-2-palmitoyl-phosphatidylcholine, and sphingomyelins.

In some embodiments the nonionic surfactants are one or more surfactants selected from the group comprising, consisting essentially of, or consisting of alkoxylated alcohols, alkoxylated alkyl phenols, or ethylene oxide/propylene oxide copolymers. In other embodiments the nonionic surfactants are alkoxylated alcohols, alkoxylated alkyl phenols, or ethylene oxide/propylene oxide copolymers having an hydrophilic-lipophilic balance (HLB) greater than about 10, for example about 10 to 20, or about 10 to 18, or about 10 to 16, or about 10 to 14, or about 11 to 20, or about 11 to 18, or about 11 to 17, or about 11 to 16, or about 11 to 15, or about 11 to 14, or about 11 to 13, and mixtures of these compounds. In some embodiments, the nonionic surfactants are ethoxylated C6-C14 or C10-C14 alcohols and alkyl phenols. In some embodiments the nonionic surfactants are polyoxyethylene alkyl ether, polyoxyethylene alkylphenol ether, ethylene oxide-propylene oxide block copolymers, alkyl glucoside, polyoxyethylene fatty acid ester, sucrose fatty acid ester, sorbitan fatty acid ester, polyoxyethylene sorbitan fatty acid ester, and fatty acid alkanolamide. In some embodiments the nonionic surfactant is ethoxylated castor oil, dimethyl-lauryl-amine, 00-16 alkyl dimethylamines, alkoxylated ethylenediamine, ethoxylated alcohol, ethoxylated hexanol or mixtures thereof.

In some embodiments the surfactants are a blend of amphoteric surfactants, anionic surfactants, nonionic surfactants and mixtures thereof. In some embodiments, the anionic surfactants are salts (including, for example, sodium, potassium, ammonium, and substituted ammonium salts such as mono-, di-, and triethanolamine salts) of the anionic sulfate, sulfonate, carboxylate and sarcosinate surfactants. In other embodiments, the anionic surfactants are isethionates such as the acyl isethionates, N-acyl taurates, fatty acid amides of methyl tauride, alkyl succinates, sulfoacetates, and sulfosuccinates, monoesters of sulfosuccinate (e.g., saturated and unsaturated C12-C18 monoesters), diesters of sulfosuccinate (e.g., saturated and unsaturated C6-C14 diesters), and N-acyl sarcosinates.

In some embodiments the anionic surfactant is a sulfosuccinate. In some embodiments the sulfosuccinate are C8-C22 sulfosuccinates. In still other embodiments the anionic surfactant is sodium dodecylbenzene sulfonate, nacconol 90G, dioctyl sodium sulfosuccinate, sodium-toluene sulfonate, sodium benzene sulfonate, linear alkylbenzene sulfonates (LAS) or sodium dodecyl sulfate (SDS).

In some embodiments the composition has a ratio of amine functionalized nanoparticle to surfactant having a mass ratio of 100:1 to 1:100.

The composition comprising, consisting essentially of, or consisting of combination of the amine functionalized nanoparticles, solvent and/or surfactants can be variously formulated. In some embodiments, the composition is an injectate. An injectate is any aqueous composition that is injected into a subterranean formation to bring about an increase in yield or rate of recovery of a hydrocarbon from the subterranean formation. In some embodiments, the composition is a concentrate. In some embodiments the composition is a fracturing fluid or drilling fluid.

In some embodiments, the composition comprises, consists essentially of, or consists of amine functionalized nanoparticles, a stability component, and a surfactant composition, the surfactant composition comprising, consisting essentially of, or consisting of amphoteric surfactants and nonionic surfactants or mixtures thereof, a solvent selected from a water source, mutual solvents or mixture thereof.

In further embodiments, the composition comprises, consists essentially of, or consists of amine functionalized nanoparticles, a stability component, and a surfactant composition, the surfactant composition comprising, consisting essentially of, or consisting of amphoteric surfactants, nonionic surfactants, anionic surfactants, or mixtures thereof, a solvent selected from a water source, mutual solvents or mixture thereof.

In some embodiments, the disclosed compositions are made using produced water and are suitable for injection into a subterranean formation, where the fluids remain stable and do not cause precipitation, separation, or another behavior attributable to instability, while flowing underground. This in turn results in optimal recovery of hydrocarbons from the subterranean formation including where high temperatures, high salinity or both are encountered underground.

The disclosed compositions may include additional components or additives, such oxidizing agents, water-soluble enzymes, clay stabilizers, corrosion inhibitors, scale inhibitors, viscosifying agents, flow back aids, friction reducers, proppants, biocides, buffers, or in various combinations depending on the chemical and physical attributes of the particular subterranean formation. In some embodiments the additive includes oil field additives conventionally used in hydraulic fracturing or post-primary fracturing of subterranean hydrocarbon-containing formations. In some embodiments, the additives are added to the concentrates, and the resulting concentrates are stable, or even storage stable. In other embodiments, the additives are not added to the concentrate, but rather are added to the subterranean formation contemporaneously with dilution of the concentrate to form an injectate, or are added to the injectate after the injectate is formed.

In some embodiments, an injectate is formed by combining amine functionalized nanoparticles with one or more surfactants with a water source. In some embodiments the water source is water or water with one or more solids dissolved therein. In some embodiments the water source includes 0.5 wt % and as much as 30 wt % dissolved solids in the form of salts or ions.

Methods of Making

The amine functionalized nanoparticles as described herein can be made in a two-step process to coat the nanoparticles and thereafter covalently bond thereto a shell structure to provide the amine functionalized nanoparticle. In an embodiment the nanoparticles are stabilized through a sequential treatment with a first step of coating a nanoparticle with the trialkoxyorganosilane, such as (3-glycidyloxypropyl)trimethoxysilane, and thereafter covalently bonding an amine-functionalized silane to the surface of the coated nanoparticle, such as shown in FIG. 1 to provide amine groups on the surface of the nanoparticle.

The amine functionalized nanoparticles are made by and are the reaction products of the methods described herein, namely a two-step process to coat the nanoparticles with a covalent bonding of the trialkoxyorganosilane and thereafter further functionalizing the surface or the shell of the nanoparticle by covalently bonding thereto a shell structure to provide the amine functionalized nanoparticle. In an embodiment the nanoparticles are the reaction product of the sequential treatment with a first step of coating (through covalent bonding) a nanoparticle with the trialkoxyorganosilane and thereafter covalently bonding an amine-functionalized silane to the surface of the coated nanoparticle, such as shown in FIG. 1 to provide amine groups on the surface of the nanoparticle.

The reaction can be carried out under conditions known for functionalization of nanoparticles with silanes, including at temperatures of about 0-100° C. for a period of time up to about 48 hours (or from a few minutes to about 48 hours), or preferably about 12-24 hours. As one skilled in the art will ascertain the inclusion of a catalyst in the reaction can significantly reduce the reaction time for the functionalization of the nanoparticles.

Without being limited to a particular mechanism of action of the coating and thereafter functionalization of the nanoparticular, the methods of making the amine functionalized nanoparticles beneficially coat the surface (i.e., shell) of the nanoparticles with the amine silane groups as a result of the initial coating with the trialkoxyorganosilane. Moreover, the covalent bonding of the amine silane groups ensures the functional groups do not go into solution when the stabilized nanoparticles are put into a dispersion for applications of use, instead they remain on the surface of the nanoparticles to provide the thermal and brine stability.

Methods of Use

Any of the nanoparticles and compositions described herein can be used to recover or enhance the effectiveness of recovering hydrocarbons. Disclosed herein are methods of treating a subterranean formation, comprising, consisting essentially of, or consisting of, introducing into the subterranean formation any of the compositions described herein. In some embodiments, the introduction is by injecting the fluid into a subterranean formation to be treated. In some embodiments, the composition breaks up deposits present in the subterranean formation, alters the wettability of the subterranean formation to water wet, and increases the relative permeability of the subterranean formation to hydrocarbons or combinations thereof. In some embodiments, break up of deposits, the alteration of the wettability of the subterranean formation to water wet, and/or the increase of the relative permeability of the subterranean formation for hydrocarbons results in the increased flow of hydrocarbons from the subterranean formation. In some embodiments, the compositions can be used to improve relative permeability to hydrocarbon. The compositions described herein can also be used to increase the production of hydrocarbons from a subterranean formation that has already been subject to prior subterranean formation stimulation such as hydraulic fracturing or matrix stimulation. In some embodiments, the compositions can be used to enhanced oil recovery stimulation where compositions are pumped with water into injection well(s) and the oil is recovered from production well(s). In some embodiments, the compositions can be used as additives to stimulation fluids (such as hydraulic fracturing fluids) to alter rock wettability to water wet and reduce water leak-off. In some embodiments, the compositions can be injected with other treatment fluids into the formation prior to pumping the stimulation fluids.

A concentration of the nanoparticles (or nanoparticles in a composition) can be between about 1 ppm and about 5,000 ppm, such as 100 ppm and about 5,000 ppm, between about 100 ppm and about 200 ppm, between about 200 ppm and about 500 ppm, between about 500 ppm and about 1,000 ppm, between about 1,000 ppm and about 2,500 ppm, or between about 2,500 ppm and about 5,000 ppm. However, the disclosure is not so limited and the concentration of the nanoparticles in the suspension may be lower or higher depending on a particular application.

A pH of the suspension may be between about 3.0 and about 12.0. In some embodiments, the suspension may exhibit a basic pH, such as a pH greater than about 9.0, greater than about 10.0, or even greater than about 11.0. In other embodiments, the suspension may exhibit a pH between about 7.0 and about 9.0, such as about 8.0. In other embodiments, the suspension may exhibit an acidic pH, such as a pH between about 3.0 and about 7.0, such as between about 3.0 and about 5.0, or between about 5.0 and about 7.0.

In some embodiments, the pH of the suspension may be about 3.0. However, the disclosure is not so limited, and the suspension may exhibit a different pH.

In some embodiments, the composition (e.g., injectate) is disposed within the subterranean formation for at least 7 to 90 days, where it does not separate, precipitate or coagulate. In other embodiments, the method includes injecting an injectate into a first well which is in fluid connection with a subterranean hydrocarbon-containing formation, followed by collecting one or more hydrocarbon compounds from the first well. In other embodiments, the method includes injecting an injectate into a first well which is in fluid connection with a subterranean hydrocarbon-containing formation, followed by collecting one or more hydrocarbon compounds from a second well, wherein the second well is also fluidly connected to the subterranean hydrocarbon-containing formation. In some embodiments, one or more such wells are wellbores namely is, man-made fluid connections to a subterranean formation that is further adapted to collect the hydrocarbon.

After subterranean injection, rock contacted by the composition according to any of the above embodiments changes from oil-wettable to water-wettable.

In some embodiments, the introducing (e.g., injecting) of the composition is carried out after hydraulic fracturing of the subterranean formation. In some embodiments, the composition is injected into a subterranean formation wherein no hydraulic fracturing has been carried out. In other embodiments, injecting of the composition is carried out contemporaneously with hydraulic fracturing of the subterranean formation. In some embodiments the composition and methods are particularly useful in secondary and tertiary oil recovery, collectively referred herein as enhanced oil recovery, which is any injection carried out after the fluid connection of a well is already established. In some embodiments, the composition and methods are particularly useful in obtaining hydrocarbon from tight or very tight subterranean rock formation.

In some embodiments, a method to enhance hydrocarbon displacement is to alter the wettability of a subterranean formation. Wettability is a tendency of a liquid to spread on a solid surface. In some embodiments, a water-wet surface has a contact angle for water between 0 to 90 degrees as measured from the surface. A surface having a contact angle at or above ninety degrees for water is described as non-water wet. Similarly, an oil-wet surface has a contact angle for oil between 0 to 90 degrees. A surface having a contact angle at or above ninety degrees for oil is described as non-oil wet.

The disclosed compositions and methods are used to enhance hydrocarbon recovery from subterranean formations that have previously been depleted. In some embodiments, the disclosed compositions and methods are used to obtain oil from subterranean formations that are tight rock formations or very tight rock formations. In other embodiments, the subterranean formations are shale formations. In other embodiments, the formation is a tight, or very tight shale formation.

The present disclosure is further defined by the following numbered paragraphs:

An amine functionalized nanoparticle comprising: a core-shell nanoparticle morphology comprising a trialkoxyorganosilane coated nanoparticle core and an amine functionalized group on the surface of the nanoparticle as a shell, and wherein the nanoparticle has an average particle size from about 1 nm to about 1000 nm.

The nanoparticle of paragraph 1, wherein the nanoparticle has an average particle size from about 1 nm to about 500 nm, or from about 1 nm to about 200 nm.

The nanoparticle of any one of paragraphs 1-2, wherein the nanoparticles are selected from silica and metal-based nanoparticles.

The nanoparticle of paragraph 3, wherein the silica is selected from the group consisting of colloidal silica, nanosilica, silicate nanoparticle, polyhedral oligomeric silsesquioxane nanoparticle, and silicon dioxide nanoparticle dispersion.

The nanoparticle of any one of paragraphs 1-4, wherein the nanoparticles are free of ceramics and carbon or carbon-based materials.

The nanoparticle of any one of paragraphs 1-5, wherein the trialkoxyorganosilane is an epoxy functional silane, hydroxylic hydrophilic silane, hydroxyl functional silane, or thiol functional silane.

The nanoparticle of any one of paragraphs 1-6, wherein the amine functionalized group is provided by an amine-functionalized silane according to formula I or II, wherein: $R^1$, $R^2$, and $R^3$ are independently —$OMCH_3$, —OH, —$CH_3$, or —Cl and wherein M is absent, —$(CH_2)_m$—, or —$(CH_2Y)_n$—, wherein m is an integer from 1 to 5, n is an integer from 1 to 5, wherein Y is O, N, or S; and $R^4$ is —$CH_2$, or a substituted or an unsubstituted, linear or branched C2-C20 alkyl group, or —(Ar)—; $R^5$ is absent or H; and $R^6$ is —$CH_3$, a substituted or an unsubstituted, linear or branched C2-C20 alkyl group or a primary, secondary, tertiary or quaternary alkyl amine, —(Ar)—, =$(CNH_2NH_2)$, —$((CH_2)_oNH_2)$, —$((CH_2)_oNHCH_3)$, —$((CH_2)_oNH(CH_2)_pNH_2)$, —$((CH_2)_oNH(CH_2)_pAr)$, wherein o and p are independently integers from 1 to 15.

The nanoparticle of any one of paragraphs 1-7, wherein the amine functionalized group is covalently bonded to the trialkoxyorganosilane coated nanoparticle.

The nanoparticle of any one of paragraphs 1-8, wherein the molar ratio of the trialkoxyorganosilane to the amine-functionalized silane is about 1:1 to about 100:1 or about 1:1 to about 20:1, and the mass ratio of the trialkoxyorganosilane coated nanoparticle core to the amine-functionalized silane on the coated nanoparticle is about 1:1 to about 100:1 or about 1:1 to about 40:1.

The nanoparticle of any one of paragraphs 1-9, wherein the nanoparticle is stable at a TDS in excess of about 100,000, in excess of about 150,000, in excess of about 200,000, or in excess of about 250,000 for at least about 7 days.

The nanoparticle of any one of paragraphs 1-10, wherein the nanoparticle is stable at a temperature from about 60° C. to about 250° C., about 100° C. to 250° C., or about 100° C. to 150° C.

An amine functionalized nanoparticle comprising:
a reaction product obtained by a first step of coating a nanoparticle with a trialkoxyorganosilane and thereafter covalently bonding an amine-functionalized silane to the surface of the coated nanoparticle,
wherein the reaction product has a core-shell nanoparticle morphology comprising the trialkoxyorganosilane coated nanoparticle core and the amine functionalized group on the surface of the coated nanoparticle core as a shell, and
wherein the nanoparticle has an average particle size from about 1 nm to about 1000 nm.

The nanoparticle of paragraph 12, wherein the nanoparticle has an average particle size from about 1 nm to about 500 nm, or from about 1 nm to about 200 nm.

The nanoparticle of any one of paragraphs 12-13, wherein the nanoparticles are selected from silica and metal-based nanoparticles.

The nanoparticle of paragraph 14, wherein the silica is selected from the group consisting of colloidal silica, nanosilica, silicate nanoparticle, polyhedral oligomeric silsesquioxane nanoparticle, and silicon dioxide nanoparticle dispersion.

The nanoparticle of any one of paragraphs 12-15, wherein the nanoparticles are free of ceramics and carbon or carbon-based materials.

The nanoparticle of any one of paragraphs 13-17, wherein the trialkoxyorganosilane is an epoxy functional silane, hydroxylic hydrophilic silane, hydroxyl functional silane, or thiol functional silane.

The nanoparticle of any one of paragraphs 12-17, wherein the amine functionalized group is provided by an amine-functionalized silane according to formula I or II, wherein: $R^1$, $R^2$, and $R^3$ are independently —OMCH$_3$, —OH, —CH$_3$, or —Cl and wherein M is absent, —(CH$_2$)$_m$—, or —(CH$_2$Y)$_n$—, wherein m is an integer from 1 to 5, n is an integer from 1 to 5, wherein Y is O, N, or S; and $R^4$ is —CH$_2$, or a substituted or an unsubstituted, linear or branched C2-C20 alkyl group, or —(Ar)—; $R^5$ is absent or H; and $R^6$ is —CH$_3$, a substituted or an unsubstituted, linear or branched C2-C20 alkyl group or a primary, secondary, tertiary or quaternary alkyl amine, —(Ar)—, =(CNH$_2$NH$_2$), —((CH$_2$)$_o$NH$_2$), —((CH$_2$)$_o$NHCH$_3$), —((CH$_2$)$_o$NH(CH$_2$)$_p$NH$_2$), —((CH$_2$)$_o$NH(CH$_2$)$_p$Ar), wherein o and p are independently integers from 1 to 15.

The nanoparticle of paragraph 18, wherein the amine-functionalized silane is 3-aminopropyl)trimethoxysilane.

The nanoparticle of any one of paragraphs 12-19, wherein the amine functionalized group is covalently bonded to the trialkoxyorganosilane coated nanoparticle.

The nanoparticle of any one of paragraphs 12-20, wherein the molar ratio of the trialkoxyorganosilane to the amine-functionalized silane is about 1:1 to about 100:1 or about 1:1 to about 20:1, and the mass ratio of the trialkoxyorganosilane coated nanoparticle core to the amine-functionalized silane on the surface of the coated nanoparticle is about 1:1 to about 100:1 or about 1:1 to about 40:1.

An amine functionalized nanoparticle composition comprising the nanoparticle any of any one of paragraphs 1-21 dispersed in an aqueous medium.

A composition for improving hydrocarbon recovery from a subterranean formation, the composition comprising: an amine functionalized nanoparticle according to any one of paragraphs 1-21, a surfactant, a coupler and/or a solvent.

The composition of paragraph 23, wherein the surfactant comprises an amphoteric surfactant, nonionic surfactant, anionic surfactant or a mixtures thereof, and wherein the solvent comprises a water source, mutual solvent, or mixture thereof.

The composition of any one of paragraphs 23-24, wherein the surfactant comprises a nonionic surfactant comprising alkoxylated alcohols, alkoxylated alkyl phenols, or ethylene oxide/propylene oxide copolymers having an HLB of at least about 10.

The composition of paragraph 24 wherein the anionic surfactant comprises salts of sulfate, sulfonate, and/or carboxylate.

The composition of any one of paragraphs 23-26, further comprising a stability component comprises a sulfate, chloride, carbonate or oxide salt of aluminum, titanium or zirconium.

The composition of any one of paragraphs 23-27, wherein amine functionalized nanoparticle to surfactant has a ratio of 100:1 to 1:100.

An injectate composition comprising a water source and the composition of any one of paragraphs 23-28.

Use of the composition of any one of paragraphs 23-28 to increase the rate of hydrocarbon recovery, total yield of hydrocarbon recovered or both from a subterranean formation.

A method of treating a subterranean formation comprising:
introducing a treating fluid composition into a subterranean formation or well, wherein the treatment fluid composition comprises an amine functionalized nanoparticle according to any one of paragraphs 1-21, a solvent, and a surfactant composition, the surfactant composition comprising amphoteric surfactants, nonionic surfactants or a mixtures thereof.

The method of paragraph 31, wherein the solvent is selected from a water source, mutual solvent or mixture thereof.

The method of any one of paragraphs 31-32, wherein the introducing is injecting the treatment fluid composition into the subterranean formation or well.

The method of any one of paragraphs 31-33, wherein the treatment fluid composition is a drilling fluid, a fracturing fluid, or an injectate.

The method of paragraph 34, wherein the injectate comprises the treating fluid composition and a water source.

The method paragraph 35, wherein the water source comprises a produced water or high total dissolved solids, a high temperature water source or a combination of high total dissolved solids and a high temperature water source.

The method of any one of paragraphs 31-36, wherein the subterranean formation or well comprises a low permeability formation.

The method of paragraph 37, wherein the low permeability formation of less than 0.1 mD, or less than 0.01 mD.

The method of any one of paragraphs 31-38, wherein the subterranean formation comprises secondary or tertiary wells, or a shale formation.

The method of any one of paragraphs 31-39, further comprises providing the treating fluid.

The method of any one of paragraphs 31-40, further comprises recovering hydrocarbon from the treated subterranean formation.

The method of paragraph 41, wherein the recovered hydrocarbon comprises an oil or a condensate.

The method of any one of paragraphs 31-42, wherein the surfactant comprises an amphoteric surfactant, nonionic surfactant, anionic surfactant or a mixtures thereof.

The method of any one of paragraphs 31-42, wherein the surfactant comprises a nonionic surfactant comprising alkoxylated alcohols, alkoxylated alkyl phenols, or ethylene oxide/propylene oxide copolymers having an HLB of at least about 10.

The method of any one of paragraphs 31-42, wherein the anionic surfactant comprises salts of sulfate, sulfonate, and/or carboxylate.

The method of any one of paragraphs 31-46, wherein the treating fluid composition further comprises a stability component comprising a sulfate, chloride, carbonate or oxide salt of aluminum, titanium or zirconium.

The method of paragraph 46, wherein the stability component is aluminum sulfate, and wherein the stability component is about 0.1-20 wt % of the composition.

The method of any one of paragraphs 31-47, wherein the treatment fluid composition on contact with the subterranean formation changes the formation from an oil wettable to water wettable, and/or changes a contact angle of oil from about 60 degrees to 100 degrees, and/or changes a contact angle of water from about 50 degrees to 10 degrees.

EXAMPLES

Embodiments of improved thermal stability of silica nanoparticles are further defined in the following non-limiting Examples. It should be understood that these Examples, while indicating one or more preferred embodiments, are given by way of illustration only and are non-limiting. From the above discussion and these Examples, one skilled in the art can ascertain the essential characteristics of the disclosure, and without departing from the spirit and scope thereof, can make various changes and modifications of the embodiments of the disclosure to adapt it to various usages and conditions. Thus, various modifications of the embodiments, in addition to those shown and described herein, will be apparent to those skilled in the art from the foregoing description. Such modifications are also intended to fall within the scope of the appended claims.

The following materials are utilized in the Examples:
Colloidal Silica, CAS Number 7631-86-9
(3-Glycidoxypropyl) trimethoxysilane, CAS Number 2530-83-8
(3-aminopropyl) trimethoxysilane (APTMS), CAS Number 919-30-2
Aluminum Sulfate, CAS Number 10043-01-3

Example 1

Synthesis of APTMS Functionalized GLYMO-nanosilica. Silica nanoparticles were combined with (3-Glycidoxypropyl) trimethoxysilane to create a functionalized nanoparticle that includes a GLYMO coating. The functionalized colloidal nanosilica (EXP002032 control that is the GLYMO coated nanosilica (also referred to as GLYMO-NS)) and distilled water were combined in a 1-liter glass reactor. The activity of the colloidal silica in the reactor was 3 wt. %. The glass reactor was fitted with a thermocouple to monitor and control the temperature of the reaction. (3-aminopropyl) trimethoxysilane (APTMS) was added dropwise to the silica dispersion while mixing at 60° C. The reaction was allowed to proceed for 18-24 hours at 60° C. After 18-24 hours the reaction was finished, and it was cooled to room temperature. FIG. 1 shows the chemical reaction taking place between the functionalized colloidal nanosilica and APTMS to make the amine-functionalized colloidal silica.

Table 1 shows evaluated lab samples prepared according to this methodology of Example 1 with the silica to APTMS loading wt. % ratios shown to evaluate the impact of different loadings of APTMS to colloidal silica.

TABLE 1

| Sample | Silica to APTMS Loading (wt. %) | GLYMO to APTMS (molar ratio) |
|---|---|---|
| 1 | 40:1 | 16.44:1 |
| 2 | 13:1 | 5.51:1 |
| 3 | 5:1 | 2.06:1 |
| 4 | 2.5:1 | 1.03:1 |

The results show a benefit of a trialkoxyorganosilane to amine-functionalized silane molar ratio of about 1:1 to about 20:1, as well as a benefit of the coated silica (coated nanoparticle to APTMS mass ratio of about 1:1 to about 40:1.

Example 2

Figure 2:
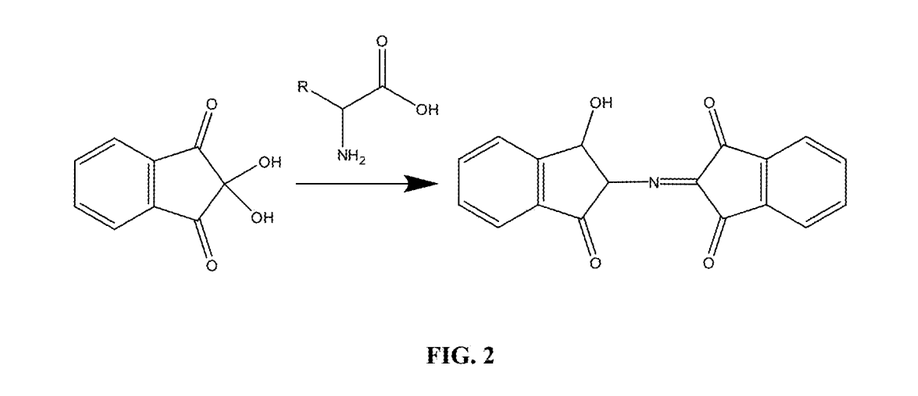
FIG. 2 shows the synthesis of Ruhemann's purple as described in Example 2 in the ninhydrin colormetric assay.

Color metric assays. The amine functionalized colloidal silica from Example 1 was purified and isolated using a centrifuge. The functionalized colloidal silica was placed in a centrifuge at 4000 rpm for 10 minutes. The liquid was decanted off and the resulting solid was washed with isopropyl alcohol (IPA). This step was repeated 2-3 times, or until the colloidal silica was free of any impurities from the reaction. After purification, the colloidal silica was redispersed in water and reacted with ninhydrin. Ninhydrin undergoes a chemical reaction with primary amines, which results in the production of a compound called Ruhemann's purple (shown in FIG. 2). The redispersed functionalized colloidal silica turned a pale purple color from the reaction with ninhydrin, which showed that the amine-functionalized groups were on the surface of the silica nanoparticle.

Example 3

Zeta Potential Measurements. The amine functionalized colloidal silica from Example 1 was purified and isolated using a centrifuge. The functionalized colloidal silica was placed in a centrifuge at 4000 rpm for 10 minutes. The liquid was decanted off and the resulting solid was washed with isopropyl alcohol (IPA). This step was repeated 2-3 times until the colloidal silica was free of any impurities from the reaction. After purification, the colloidal silica was redispersed in water. The samples of amine functionalized colloidal silica were then measured for zeta potential at 500 ppm at pH 3 in 10 mM of sodium chloride solution. The resulting positive charge on the surface of the nanoparticle relative to the control sample indicates that silica nanoparticles have been amine functionalized with APTMS. Table 2 shows the Zeta Potential measurements of APTMS functionalized colloidal silica.

TABLE 2

| Sample | Zeta Potential at pH 3 (mV) |
|---|---|
| Colloidal nanosilica | approximately 0 (pH 2-3 is the isoelectric point) |
| EXP002032 Control | −1.1 ± 0.8 |
| 1 | 6.3 ± 0.3 |
| 2 | 11.4 ± 3.0 |
| 3 | 14.1 ± 2.5 |
| 4 | 15.0 ± 0.1 |

The results show a positive zeta potential of the amine functionalized nanoparticles evaluated, confirming the increase in charge on the surface of the nanoparticle showing the amine functional group on the surface of the nanoparticle.

Example 4

Thermal stability under Bakken conditions. The amine-functionalized nanosilica, produced in Example 1, were set up in thermal stability experiments at 130° C. with 270 k (270,000 TDS) Bakken produced brine, the conditions for which are shown in Table 3. The amine-functionalized nanosilica samples were added to high pressure rated glass test tubes and compared to control colloidal silica (EXP002032, GLYMO-NS) and a control brine (Bakken Brine). The solution of amine-functionalized nanosilica may be used in combination with aluminum sulfate. The amine on the surface of the nanoparticle improved stability of the nanoparticle with or without the presence of aluminum sulfate relative to the control experiments, as is evidenced in Examples 5-7.

TABLE 3

Bakken Produced Brine Recipe

| Salt | g/L |
|---|---|
| CaCl$_2$•2H$_2$O | 52.16 |
| MgCl$_2$•6H$_2$O | 9.59 |
| NaCl | 237.89 |
| KCl | 14.51 |
| NaBr | 1.12 |
| DI water | 904.73 |
| Total (g) | 1220 |

Thermal stability of the nanoparticles was measured by combining a sample of the Control (EXP002032 GLYMO-NS) to Bakken Brine and Sample 2 to Bakken Brine, with each sample at a concentration of 500 ppm. Each solution was added to a glass test tube and heated to 130° C. The stability was monitored over the course of 12 days. The amine-functionalized nanoparticle demonstrated enhanced stability over the Control colloidal silica as described in Table 4.

TABLE 4

Thermal Stability of Colloidal Silica samples without aluminum sulfate.

| Sample Name | EXP002032 | 2 |
|---|---|---|
| Colloidal Silica Composition NP | GLYMO-NS 500 ppm | APTMS:GLYMO-NS 500 ppm |
| Aluminum Sulfate | 0 ppm | 0 ppm |
| Stability | | |
| 0 day | ✓ | ✓ |
| 1 day | ✓ | ✓ |
| 5 days | X | ✓ |
| 8 days | X | ✓ |
| 12 days | X | X |

Additional evaluation of stability of the Control and Sample 2 in Bakken Brine at a concentration of 475 ppm, along with 25 ppm of aluminum sulfate was performed. The total concentration of nanoparticle and aluminum sulfate was 500 ppm. Each solution of nanoparticle was added to a glass test tube and heated to 130° C. The stability was monitored over the course of 17 days. The amine-functionalized nanoparticle (sample 2) was stable for longer than the control colloidal silica sample EXP002032 as described in Table 5 below.

TABLE 5

Thermal Stability of Colloidal Silica samples with aluminum sulfate.

| Sample Name | EXP002032 | 2 |
|---|---|---|
| Colloidal Silica Composition NP | GLYMO-NS 475 ppm | APTMS:GLYMO-NS 475 ppm |
| Aluminum Sulfate | 25 ppm | 25 ppm |
| Stability | | |
| 0 day | ✓ | ✓ |
| 1 day | ✓ | ✓ |
| 5 days | ✓ | ✓ |
| 8 days | ✓ | ✓ |
| 12 days | X | ✓ |
| 17 days | X | X |

Example 5

Turbidity. Turbidity measurements were taken of the samples from Example 4 to quantify any precipitation. A sample has greater thermal stability if there is little to no precipitation, which corresponds to a lower number in the turbidity measurement. Likewise, a higher turbidity measurement indicates the sample has significant precipitation and lacks desired thermal stability. All samples containing the amine-functionalized silane showed less precipitation and had a lower turbidity measurements after thermal treatment when compared to the Controls. The lower turbidity measurements indicate that the samples with an amine-functionalized groups have improved thermal stability under the Bakken brine conditions relative to non-amine functionalized silica (Control, EXP002032). The results are shown in Table 6 with turbidity data before and after thermal treatment.

TABLE 6

Thermal stability in Bakken Brine at 130° C.

| Sample Description | Modified Bakken brine (control) | EXP002032 | EXP002032 + 5% Aluminum Sulfate | Sample 2 | Sample 2 + 5% Aluminum Sulfate |
|---|---|---|---|---|---|
| Silane | | GLYMO | GLYMO | ATPMS/GLYMO | ATPMS/GLYMO |
| Turbidity (NTU) before thermal treatment | | | | | |
| #1 | 0.08 | 0.78 | 0.73 | 0.66 | 0.78 |
| #2 | 0.01 | 0.6 | 0.78 | 0.46 | 0.87 |
| #3 | 0.02 | 0.81 | 0.79 | 0.57 | 0.81 |
| #4 | 0.04 | 0.6 | 0.71 | | 0.92 |
| average | 0.04 | 0.70 | 0.75 | 0.56 | 0.85 |
| Turbidity (NTU) after thermal treatment | | | | | |
| #1 | 0.18 | 40.1 | 1.73 | 22.1 | 0.71 |
| #2 | 0 | 39.5 | 2.16 | 23.4 | 0.66 |
| #3 | 0.01 | 39.5 | 1.88 | 21.8 | 0.63 |
| #4 | | 39.9 | 2.1 | 23.8 | 0.62 |
| average | 0.06 | 39.75 | 1.97 | 22.78 | 0.66 |

It is to be understood that while the disclosure has been described in conjunction with the detailed description thereof, the foregoing description is intended to illustrate, and not limit the scope of the disclosure, which is defined by the scope of the appended claims. Other embodiments, advantages, and modifications are within the scope of the following claims. Any reference to accompanying drawings which form a part hereof, are shown, by way of illustration only. It is understood that other embodiments may be utilized, and structural changes may be made without departing from the scope of the present disclosure. All publications discussed and/or referenced herein are incorporated herein in their entirety.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the disclosure in diverse forms thereof.

What is claimed is:

1. A treatment fluid composition comprising:
an amine functionalized nanoparticle, a surfactant composition, and a solvent comprising a water source, mutual solvent, or mixture thereof, wherein the amine functionalized nanoparticle comprises a core-shell nanoparticle morphology comprising a trialkoxyorganosilane coated nanoparticle core and an amine functionalized group on the surface of the trialkoxyorganosilane coated nanoparticle core as a shell, wherein the amine functionalized nanoparticle has an average particle size from about 1 nm to about 1000 nm, wherein a molar ratio of the trialkoxyorganosilane coated nanoparticle core to the amine-functionalized silane on the coated nanoparticle is about 1:1 to about 20:1, and wherein the treatment fluid composition is introduced into a subterranean formation or well.

2. The composition of claim 1, wherein the nanoparticle is selected from silica and metal-based nanoparticles, and wherein the silica is selected from the group consisting of colloidal silica, nanosilica, silicate nanoparticle, polyhedral oligomeric silsesquioxane nanoparticle, and silicon dioxide nanoparticle dispersion.

3. The composition of claim 1, wherein the nanoparticle is free of ceramics and carbon or carbon-based materials.

4. The composition of claim 1, wherein the trialkoxyorganosilane is an epoxy functional silane, hydroxylic hydrophilic silane, or hydroxyl functional silane.

5. The composition of claim 1, wherein the amine functionalized group is provided by an amine-functionalized silane according to formula I or II, wherein:
R$^1$, R$^2$, and R$^3$ are independently —OMCH$_3$, —OH, —CH$_3$, or —Cl and wherein M is absent, —(CH$_2$)$_m$—, or —(CH$_2$Y)$_n$—, wherein m is an integer from 1 to 5, n is an integer from 1 to 5, wherein Y is O, N, or S; and
R$^4$ is —CH$_2$, or a substituted or an unsubstituted, linear or branched C2-C20 alkyl group, or —(Ar)—;
R$^5$ is absent or H; and
R$^6$ is —CH$_3$, a substituted or an unsubstituted, linear or branched C2-C20 alkyl group or a primary, secondary, tertiary or quaternary alkyl amine, —(Ar)—, =(CNH$_2$NH$_2$), —((CH$_2$)$_o$NH$_2$), —((CH$_2$)$_o$NHCH$_3$), —((CH$_2$)$_o$NH(CH$_2$)$_p$NH$_2$), —((CH$_2$)$_o$NH(CH$_2$)$_p$Ar), wherein o and p are independently integers from 1 to 15.

6. The composition of claim 1, wherein the amine functionalized group is covalently bonded to the trialkoxyorganosilane coated nanoparticle.

7. The composition of claim 1, wherein a mass ratio of the trialkoxyorganosilane coated nanoparticle core to the amine-functionalized silane on the coated nanoparticle is about 1:1 to about 100:1.

8. The composition of claim 1, wherein the nanoparticle is stable at a total dissolved solids of about 100,000 mg/L to about 350,000 mg/L for at least about 7 days, and is stable at a temperature from about 60° C. to about 250° C.

9. The composition of claim 1, wherein the amine functionalized nanoparticle is a reaction product obtained by a first step of coating a nanoparticle core with a trialkoxyorganosilane coating to create the trialkoxyorganosilane coated nanoparticle core and thereafter covalently bonding the amine-functionalized silane group to the surface of the trialkoxyorganosilane coated nanoparticle core.

10. A method of treating a subterranean formation comprising:
introducing a treatment fluid composition according to claim 1 into a subterranean formation or well, wherein the surfactant composition comprising amphoteric surfactants, nonionic surfactants, anionic surfactants, or combinations thereof.

11. The method of claim 10, wherein the introducing is injecting the treatment fluid composition into the subterranean formation or well.

12. The method of claim 10, wherein the treatment fluid composition is a drilling fluid, a fracturing fluid, or an injectate, wherein the injectate comprises a water source.

13. The method of claim 12, wherein the water source of the injectate comprises a produced water or high total dissolved solids, a high temperature water source or a combination of high total dissolved solids and a high temperature water source.

14. The method of claim 10, wherein the subterranean formation or well comprises a low permeability formation of less than 0.1 mD, a secondary well, a tertiary well, or a shale formation.

15. The method of claim 10, further comprising the step of recovering hydrocarbon from the treated subterranean formation, wherein the recovered hydrocarbon comprises an oil or a condensate.

16. The method of claim 10, wherein the surfactant is a nonionic surfactant comprising alkoxylated alcohol, alkoxylated alkyl phenol, or ethylene oxide/propylene oxide copolymers having an HLB of at least about 10.

17. The method of claim 10, wherein the surfactant is an anionic surfactant comprising salts of sulfate, sulfonate, and/or carboxylate.

18. The method of claim 10, wherein the treatment fluid composition further comprises a stability component comprising a sulfate, chloride, carbonate or oxide salt of aluminum, titanium or zirconium.

19. The method of claim 10, wherein the treatment fluid composition on contact with the subterranean formation changes the formation from an oil wettable to water wettable, and/or changes a contact angle of oil from about 60 degrees to about 100 degrees, and/or changes a contact angle of water from about 50 degrees to about 10 degrees.

* * * * *